United States Patent [19]

Yanagi

[11] Patent Number: 5,241,522
[45] Date of Patent: Aug. 31, 1993

[54] OPTICAL DISK APPARATUS USING TRANSITION CONTROL BETWEEN POSITIONER SEEK CONTROL AND LENS SEEK CONTROL

[75] Inventor: Shigenori Yanagi, Kawasaki, Japan

[73] Assignee: Fujitsu Limited, Kawasaki, Japan

[21] Appl. No.: 720,693

[22] Filed: Jun. 25, 1991

[30] Foreign Application Priority Data

Jun. 26, 1990 [JP] Japan .................................. 2-167358

[51] Int. Cl.$^5$ ............................................. G11B 7/085
[52] U.S. Cl. ...................................... 369/32; 369/44.28
[58] Field of Search ............... 369/44.28, 44.29, 44.31, 369/44.25, 32

[56] References Cited

U.S. PATENT DOCUMENTS

| 4,627,038 | 12/1986 | Abed et al. | 369/44.28 |
| 5,090,001 | 2/1992 | Ito et al. | 369/44.28 |
| 5,121,370 | 6/1992 | Yanagi | 369/44.28 |

FOREIGN PATENT DOCUMENTS

| 0259913 | 3/1988 | European Pat. Off. . |
| 0272873A2 | 6/1988 | European Pat. Off. . |
| 0035191A2 | 3/1989 | European Pat. Off. . |
| 62-231430 | 10/1987 | Japan . |
| 63-010324 | 1/1988 | Japan . |
| 63-269324 | 11/1988 | Japan . |

Primary Examiner—Donald E. McElheny, Jr.
Attorney, Agent, or Firm—Staas & Halsey

[57] ABSTRACT

An optical disk apparatus with an optical disk having tracks, an optical head having an object lens, a positioner to move the optical head along the optical disk, a tracking actuator to move the object lens, a tachometer to detect the velocity of the positioner, and a seek operation controller. The seek operation controller effects a positioner seek operation to move the positioner in accordance with velocity difference between a target light beam velocity generated based on distance from a current track to a target track and an actual light beam velocity detected by the controller at a first detection period and a lens seek operation to move the tracking actuator in accordance with velocity difference between the target light beam velocity and an actual light beam velocity detected by the controller. The controller also effects a transition control operation in a transition between the positioner seek operation and lens seek operation. In the transition control operation, because an actual light beam velocity is detected by the tachometer without load of the controller, the controller can calculate the light beam velocity more accurately. Therefore, when the seek operation transfers to the lens seek operation from the positioner seek operation, the seek operation can be carried out more stably without disabling the servo control of the positioner.

20 Claims, 10 Drawing Sheets

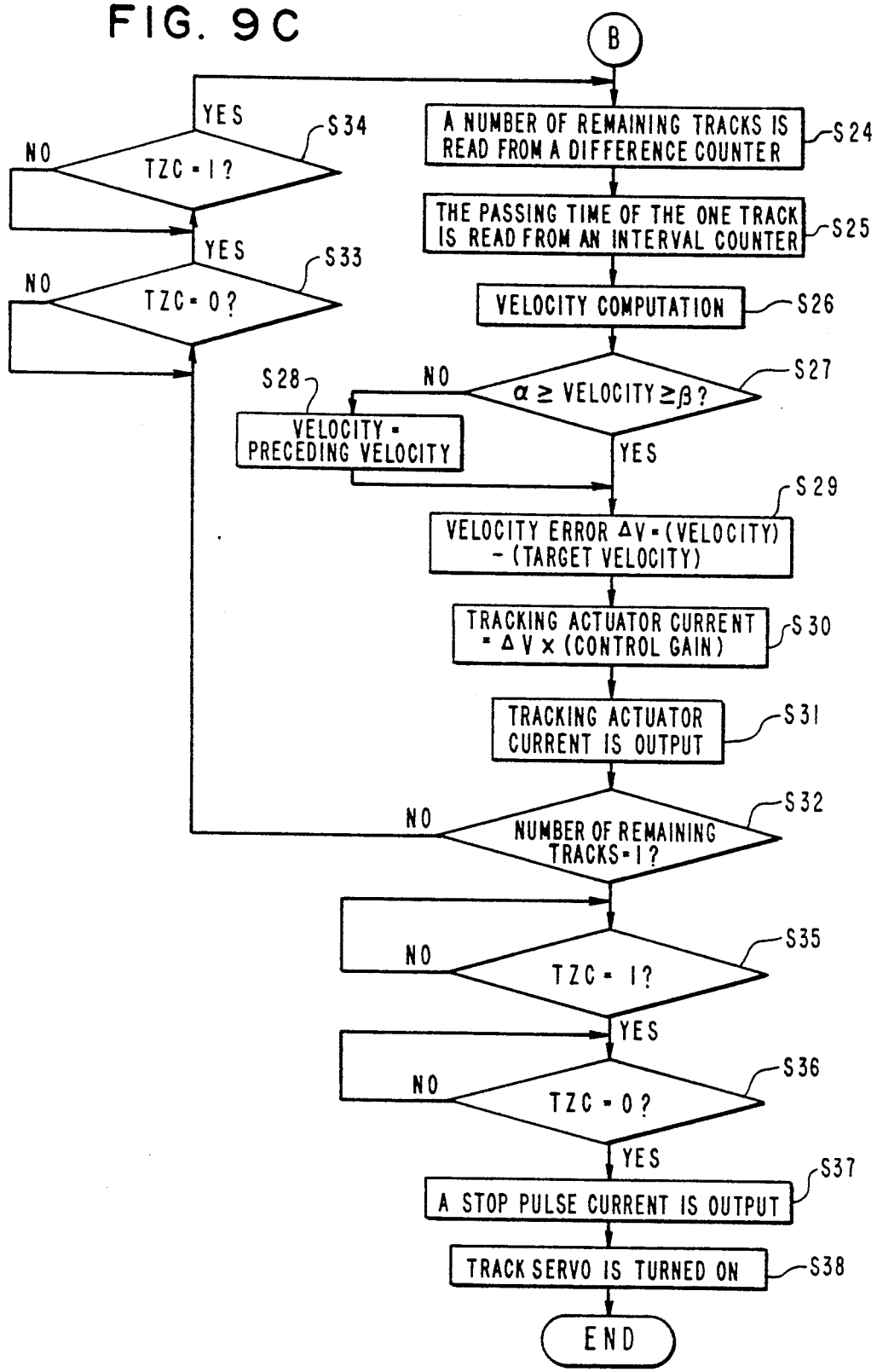

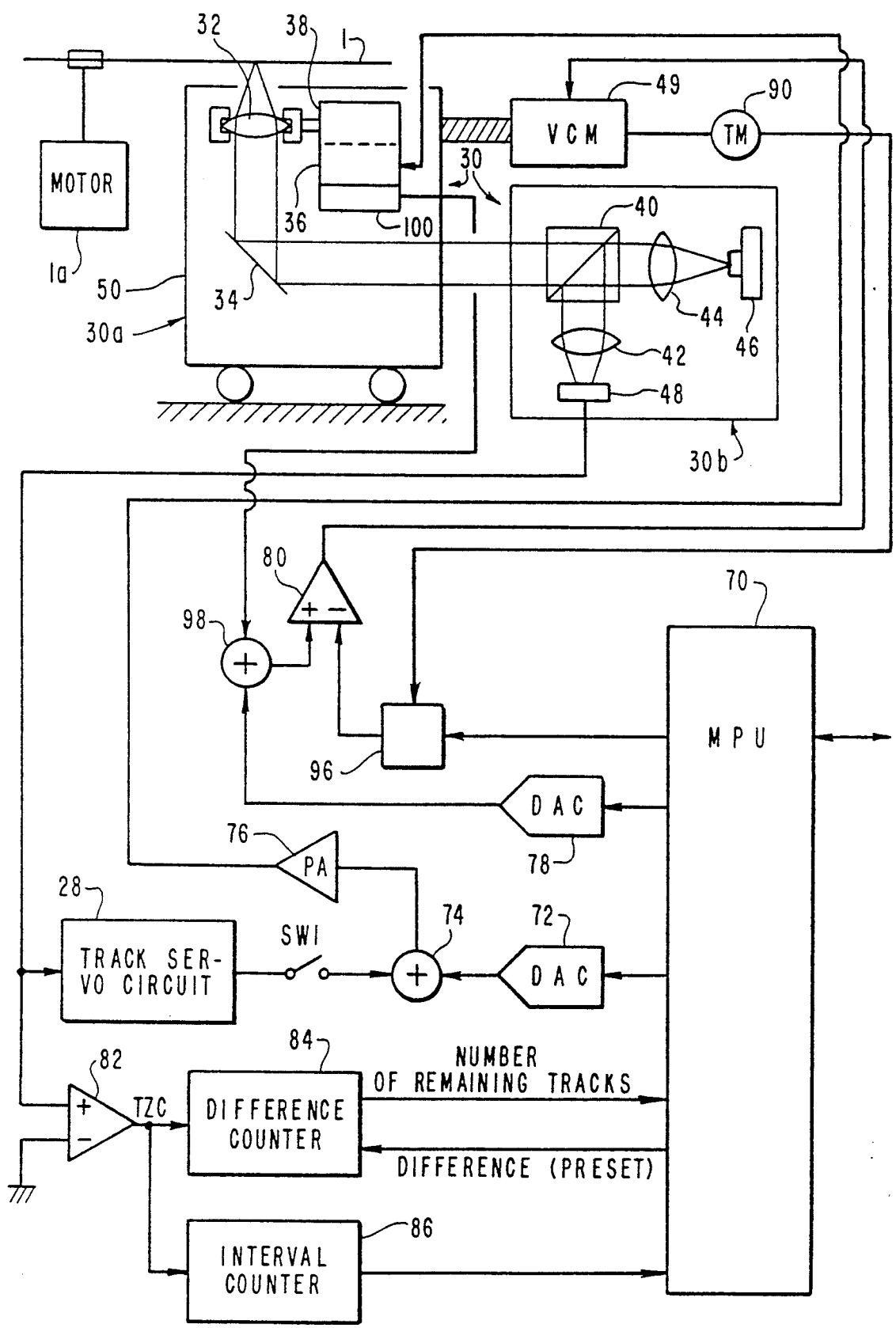

OPTICAL DISK APPARATUS USING TRANSITION CONTROL BETWEEN POSITIONER SEEK CONTROL AND LENS SEEK CONTROL

BACKGROUND OF THE INVENTION

1. Field of the Invention

This invention relates to an optical disk apparatus having a controller which carries out a seek operation and a tracking control operation for a light beam irradiated from an optical head while the light beam is moved along a surface of an optical disk and positioned on a selected track of the optical disk.

2. Description of the Related Art

A structure of a conventional optical disk apparatus will be explained with reference to FIG. 1.

In an optical disk apparatus as shown in FIG. 1, data are written onto a recording track on a recording medium such as an optical disk 1, by a beam spot focused on the optical disk 1, and the data are read out from light reflected from the optical disk 1. The optical disk 1 is rotated by a motor 1a around its center axle 1b. An optical head 2 which is driven by a motor (not shown) travels coarsely along a radial direction of the optical disk 1. The motor (not shown) is controlled by a carriage controller 5. The optical head 2 includes a semiconductor laser 24 as a light source to emit a light beam, an object lens 20, a lens 25, and a polarizing beam splitter 23. The light beam emitted from the semiconductor laser 24 is passed through the lens 25 and the polarizing beam splitter 23, and focused by the object lens 20 as a beam spot BS projected onto the optical disk 1. The optical head 2 also has a track actuator 21, e.g. tracking coil, a focus actuator 22, such as a focusing coil, a 4-division light receiver 26 and a lens 27. A light reflected from the optical disk 1 is input into the 4-division light receiver 26 through the object lens 20, the polarizing beam splitter 23, and the lens 27. The track actuator 21 is provided to move the object lens 20 along the radial direction of the optical disk 1 to track the beam spot BS on a selected track. The focus actuator 22 is provided to move the object lens 20 along the axial direction of the object lens 20 to focus the beam spot BS on the optical disk 1. The track actuator 21 is controlled by a fine tracking controller 3 which generates a tracking error signal in accordance with the RF signal output from the light receiver 26 and sends the tracking error signal to the track actuator 21 to adjust a position of the beam spot BS to the selected track to be followed.

The focus actuator 22 is controlled by a focus servo controller 4 which generates a focusing error signal in accordance with the RF signal output from the light receiver 26 and sends the focusing error signal to the focus actuator 22 to adjust a focusing point of the beam spot BS to a surface of the optical disk 1. The principle of the fine tracking control and the focusing control are well known, so an explanation of these will be omitted.

In the structure described above, in order to move the beam spot BS through many of the tracks to a target track, a so-called track-jumping method is used to move the optical head 2 by driving an actuator, such as a motor (not shown), along the orthogonal directions of the tracks for a long stroke, for example 120 mm. The actuator is controlled by a main controller using a positioner seek and tracking control. In the positioner seek operation, the main controller produces a target light beam velocity pattern including an acceleration term, a constant velocity term, and a deceleration term, and controls an actual light beam velocity detected by a sensor to be consistent with a target light beam velocity produced by the main controller, in accordance with an error value between the actual light beam velocity and the target light beam velocity.

When the light beam spot reaches the target track in the positioner seek operation, the main controller uses a tracking control operation in addition to the positioner seek operation, and positions the light beam spot on the selected target track. In the method described, however, since the tracking control is used after the light beam spot has reached the target track and the tracking actuator 21 is in a standstill at that time, if the optical disk 1 rotates with an eccentric movement, and the tracking actuator 21 cannot follow the eccentric movement, it is necessary for the main controller to re-seek to the target track. Therefore the track access time of the prior art optical disk apparatus becomes slow.

In order to resolve this problem, there is known a track-jumping method by which a main controller controls an optical disk apparatus to move a tracking actuator toward the target track while moving the optical head with the positioner seek operation. That is, when the light beam velocity is lower than a predetermined velocity, a main controller stops the control of the positioner seek operation and begins a lens seek operation in which the tracking actuator is moved under control of the main controller toward the target track and the optical head is moved to follow the tracking actuator toward the target track in accordance with an output signal of a sensor which detects the movement of the tracking actuator.

In this method, because a velocity servo control of the light beam would be used in the positioner seek operation and lens seek operation, different methods must be used for detecting a light beam velocity between the position seek operation and lens seek operation, so the main controller cannot control the tracking actuator after the velocity servo control of the light beam by the main controller is changed from the positioner seek operation to the lens seek operation.

SUMMARY OF THE INVENTION

Accordingly, it is an object of the present invention to provide an improved optical disk apparatus which can continuously control a tracking actuator after the velocity servo control of the light beam is changed from positioner seek control to lens seek control.

Additional objects and advantages of the present invention will be set forth in the description which follows, and, in part, will be clear from the description, or may be learned by practice of the invention. The objects and advantages of the invention may be realized and obtained by means of the instrumentalities and combinations particularly pointed out in the appended claims.

To achieve the foregoing objects, and in accordance with the purpose of the invention as embodied and broadly described herein, there is provided an optical disk apparatus which has an optical disk rotated at a predetermined velocity, an optical head with an object lens incident to a light beam from a light source to said optical disks, a positioner to move the optical head in a direction which crosses tracks on the optical disk, and a tracking actuator mounted on the optical head to actuate the object lens to move the light beam in the direction crossing the tracks. Positioner seek control means is also provided for controlling the positioner by producing a target light beam velocity based on a current track position and a target track position detecting a light beam velocity at a first time interval, and for moving the positioner to cause the light beam velocity to be consistent with the target light beam velocity in accordance with an error value between the target light beam velocity and the detected light beam velocity. Transition control means is provided for controlling the positioner by detecting a light beam velocity at a second time interval which is faster than the first time interval. In controlling deceleration of the light beam, either the light beam velocity detected by the positioner seek control means is lowered below a first predetermined velocity, or a remaining track number to the target track becomes a predetermined number, or both. Finally, lens seek control means are provided for controlling the tracking actuator to move the light beam to the target track position, by detecting light beam velocity and controlling the tracking actuator based on an error between the target light beam velocity and the detected light beam velocity. In controlling deceleration of the light beam, the light beam velocity detected by the transition control means is lowered below a second predetermined light beam velocity which is a velocity at which the control of the positioner can be obtained by the lens seek control means.

DESCRIPTION OF THE DRAWING

The accompanying drawings, which are incorporated in and constitute a part of the specification, illustrate embodiments of the present invention and, together with the description, serve to explain the principles of the invention. In the drawings, like numerals refer to like parts throughout.

FIGS. 9A, 9B, and 9C are flowcharts for explaining the positioner control, transition control, and lens seek operation, respectively, of the optical disk apparatus shown in FIG. 6.

FIG. 11 is a schematic diagram indicating a structure of another embodiment of an optical disk apparatus using the present invention.

DESCRIPTION OF THE PREFERRED EMBODIMENTS

Reference will now be made in detail to the present preferred embodiments of the invention, examples of which are illustrated in the accompanying drawings.

Figure 2:
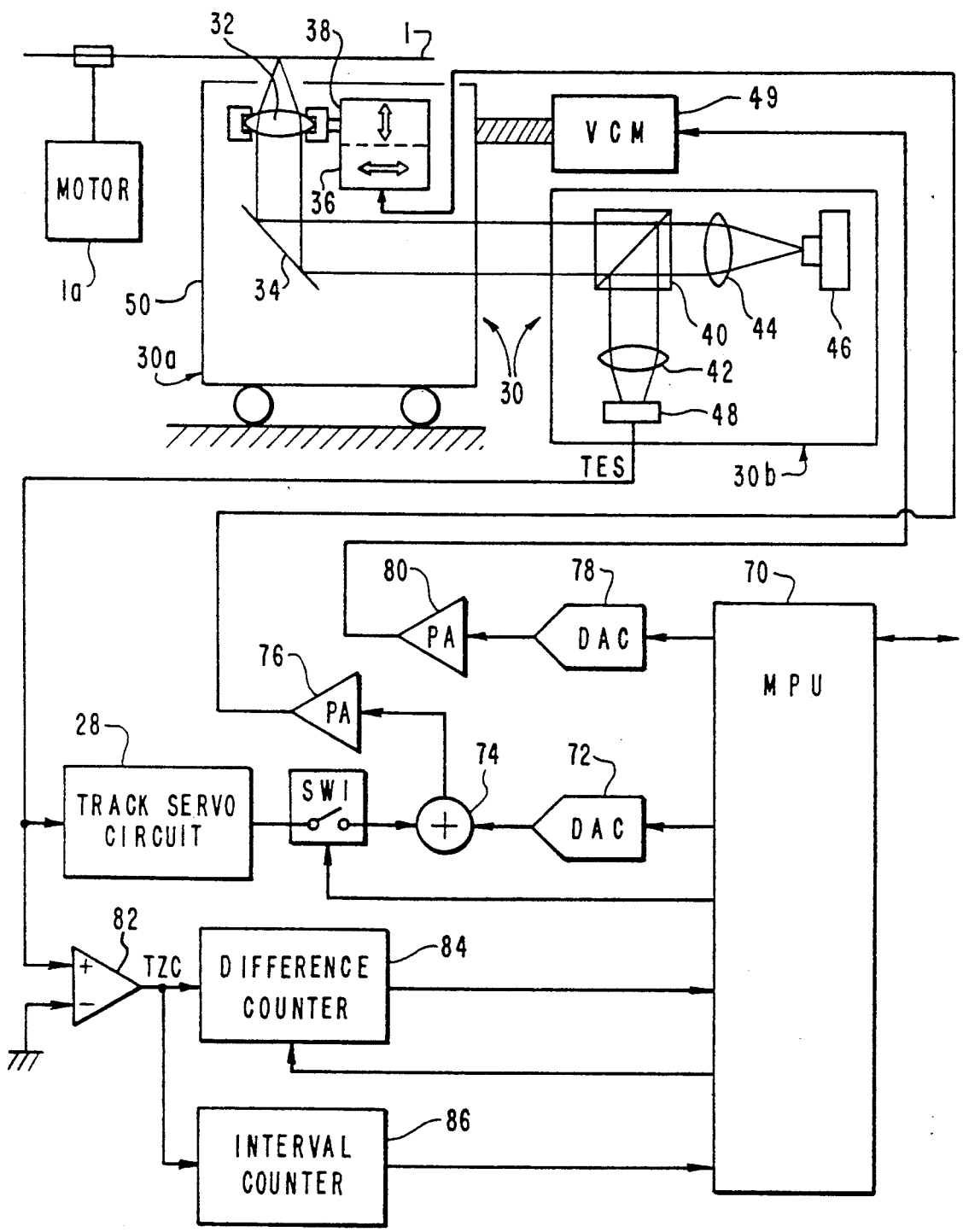
FIG. 2 is a schematic diagram of an optical disk apparatus in which the present invention is applied.

FIG. 2 is a schematic block diagram illustrating an optical disk apparatus in which the present invention is applied. In FIG. 2 an optical disk 1 is rotated at a constant velocity by a spindle motor 1a. An optical head 30 has a movable portion 30a including an object lens 32, a mirror 34, a tracking actuator 36, and a focusing actuator 38. The optical head 30 also has a fixed portion 30b including a beam splitter 40, lenses 42, 44, a semiconductor laser 46 as a light source to emit a light beam, and a tracking error detector 48.

The movable optical head portion 30a of the optical head 30 is moved in the direction of the tracks on the optical disk 1 by a positioner 49, such as a voice coil motor (VCM). The tracking actuator 36 can move the light beam in the direction crossing the tracks by moving the object lens 32. A bi-dimensional sway type actuator or a galvano-mirror, etc. is used as the tracking actuator. The tracking error detector 48 uses a 2-split photosensitive element which receives the light beam returning from the optical disk 1 through the object lens 32, mirrors 34, beam splitter 40, and lens 42 and outputs a tracking error signal TES by using the Farfield method (push-pull method).

Figure 1:
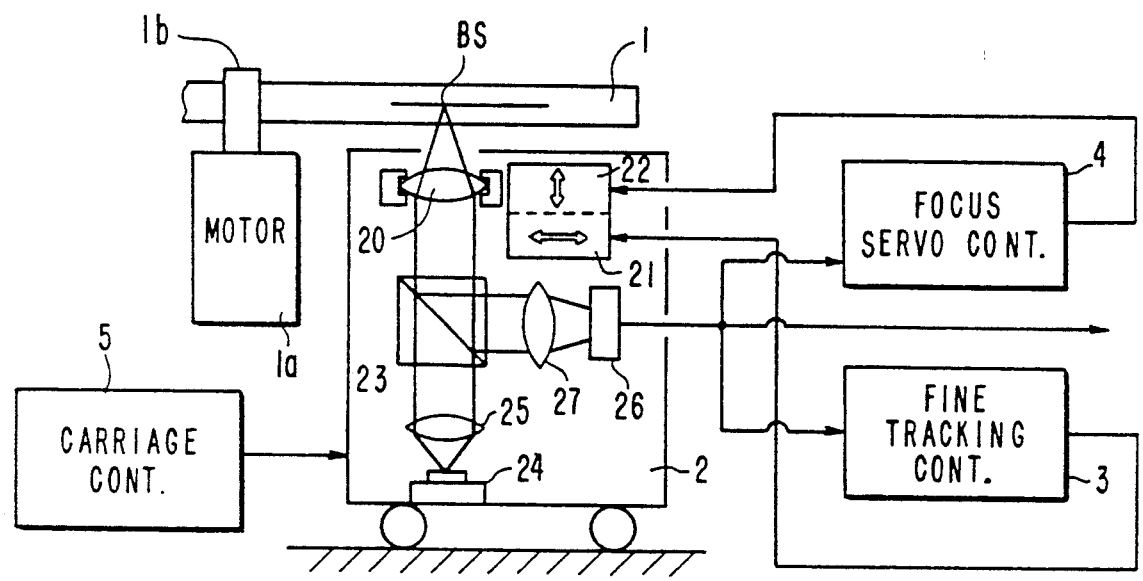
FIG. 1 is a schematic diagram of a prior art optical disk apparatus.
Figure 4:
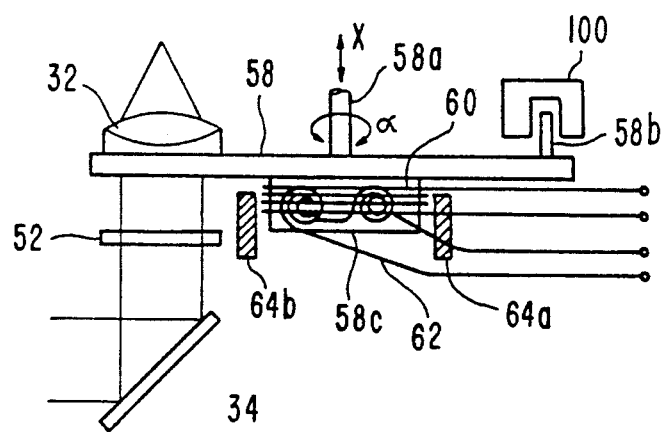
FIG. 4 is a diagram for explaining the structure of the optical head shown in FIG. 3.
Figure 3:
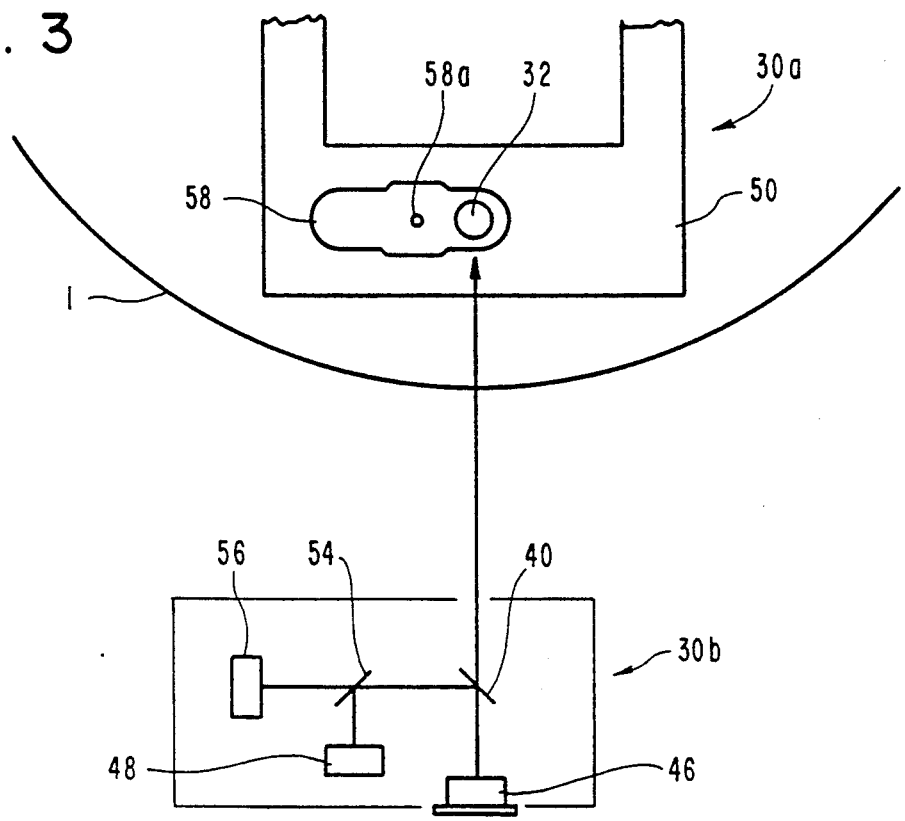
FIG. 3 is a top plan view of an optical head for the optical disk apparatus as shown in FIG. 2.

A structure of the optical head 30 will be explained in more detail with reference FIGS. 3 and 4. FIG. 3 is a top plan view of the optical head 30, and FIG. 4 is a diagram for explaining the structure of the optical head 30. The fixed optical head 30b is fixed to a housing (not shown) of the optical disk apparatus. The movable optical head 30a is mounted on a carriage 50 which is freely capable of moving in the direction crossing the tracks of the optical disk 1. The fixed optical head 30b is provided with a semiconductor laser 46. The light beam emitting from the semiconductor laser 46 is made a parallel light beam by a collimator lens 44 (in FIG. 2), and then irradiates the object lens 32 provided on the fixed optical head 30a through the beam splitter 40, the mirror 34, and a ¼ wave length plate 52 as shown in FIG.4. The light beam spot BS is thereby focused on the optical disk 1 through the object lens 32. The light beam reflecting from the optical disk 1 returns to the fixed optical head 30b through the object lens 32, the ¼ wave length plate 52, and the mirror 34. The reflecting light beam is then separated by the beam splitter 40 and 54, and then is entered to the tracking error detector 48 consisting of a 2-split or 4-split photosensor for detecting the tracking error signal TES. Furthermore, the reflecting light beam is entered to a photosensor 56 (not shown) for detecting focus error.

The object lens 32 is installed on an end of a main body 58 rotatable around an axle 58a, and a slit plate 58b is provided on the other end of the main body 58 as shown in FIG. 4. The main body 58 is provided with a coil holder 58c. The coil holder 58c has a focus coil 60 therearound and a spiral tracking coil 62 on its side. Magnets 64a, 64b are provided surrounding the coil holder 58c.

Therefore, when a current is applied to the focus coil 60 from a processor 70 through a DA converter and a power amplifier (both are not shown in figure), the main body 58 having the object lens 32 thereon moves along the axis of the object lens 32, i.e. up or down in the X direction. On the other hand, when a current is applied into the tracking coil 62 from the processor 70 (MPV) through a DA converter 72, an adder 74, and power amplifier 76, the main body 58 rotates around the axle 58a in a Y direction. Thus the light beam can move in a direction orthogonal to the tracks, i.e. the radial direction of the tracks of the optical disk 1.

A track servo circuit 52 is provided as a tracking control means for a write or read operation. The light beam is made to follow on the target track by the track servo circuit 28 through tracking actuator 36 based on the tracking error signal TES, which is output from the tracking error detector 48.

Figure 5:
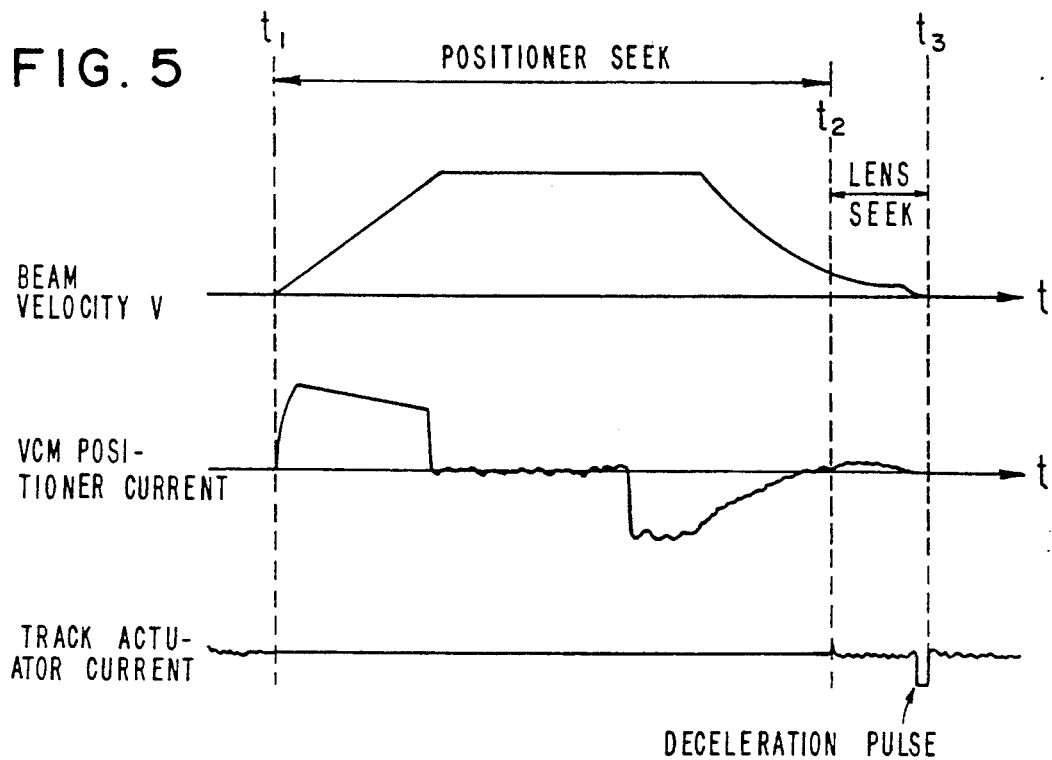
FIG. 5 is a diagram for explaining a seek operation of the optical disk apparatus shown in FIG. 2.

The processor 70 carries out the seek operation as shown in FIG. 5.

Upon reception of a seek instruction from a host controller not shown in FIG. 5, a servo switch SW1 is turned OFF at the time T1 to cancel a track servo control by the processor 70. The processor 70 then carries out a positioner seek operation in which the light beam is moved to a target track position by driving the VCM positioner 49 through a DA converter 78 and a power amplifier 80. During this positioner seek operation, the zero-cross signal TZC of the tracking error signal TES is made by a comparator 82. A difference counter 84 then counts the zero-cross signal TZC and holds a number of remaining tracks up to the target track.

After the processor 70 receives a target track number from the host computer (not shown), the processor 70 determines a number of remaining tracks up to the target track based on the target track number and a current track number.

Then, the number of remaining tracks (track difference) is initially set to the difference counter 84 by the processor 70 at the time of starting the seek operation. Thereafter a counter value of the difference counter 84 is subtracted at each passing of the light beam on the one track according to imputing zero-cross signal TZC from the comparator 82. Accordingly, the current number of remaining tracks is held in the difference counter 84, and is input to the processor 70. The processor 70 obtains a number of passing tracks in the detection period, for example, 200 μs, from the difference between the preceding and current number of remaining tracks indicated by the difference counter 84. The processor 70 then calculates the light beam velocity by dividing the passing distance with the detection period since the width of one track is previously shown, e.g. 1.6 μm. After the light beam velocity has been determined, the processor 70 determines velocity error by comparing the light beam velocity with a target velocity generated based on a number of remaining tracks. Then the processor 70 carries out velocity control by applying a current obtained by multiplying the velocity error by a predetermined control gain to the VCM positioner 49.

The velocity control of the light beam during the positioner seek operation is carried out in accordance with a target velocity pattern consisting of an acceleration term, constant velocity term and deceleration term. The target velocity pattern is generated by the processor 70 based on the target track and a current track. When the light beam velocity reaches a velocity sufficient for a lens seek operation, for example, the value lowered from a maximum velocity of the lens seek operation at the time t2 in the deceleration step of the positioner seek operation, the lens seek operation is started by driving the tracking actuator 36 (the tracking coil 62). Namely, the processor 70 drives the tracking actuator 36 through the DA converter 72, the adder 74 and the power amplifier 76. Hence, the light beam is moved to the target track by movement of the object lens 32 and thereby the lens seek is carried out. During the lens seek, an interval counter 86 measures the light beam passing time per a track based on the zero-cross signal TZC from the comparator 82 and the processor 54 determines the light beam velocity as the inverse number of the detection period of interval counter 86 for every period between the zero-cross signals. Here, the processor 70 determines velocity error by comparing the light beam velocity with the target velocity based on the number of remaining tracks. The processor 70 then determines a current to be supplied to the tracking actuator 56 by multiplying the velocity error with the predetermined control gain. After that, the current is applied to the tracking actuator 36.

Immediately before the light beam reaches the target track with the lens seek operation, the deceleration pulse current is applied to the tracking actuator 36 after the deceleration pulse width has been obtained based on the light beam velocity at this time. Thereby the light beam velocity is reduced to zero, and the lens seek is completed at the time t3. Then, the track servo circuit 28 is validated when the servo switch SWI is turned ON by the processor 54 and thereby the tracking control starts again by the track servo circuit 28.

However, the seek operation for sequentially executing positioner seek operation and lens seek operation has a problem that an accurate velocity control is impossible immediately after the positioner seek operation is transferred to the lens seek operation. That is, in the positioner seek operation, the light beam velocity is obtained from a number of passing tracks per unit time. On the other hand, in the lens seek operation, the light beam velocity is obtained from the passing time of a track. This difference in the method of detecting the light beam velocity generates velocity detection mistakes after the positioner seek operation has been transferred to the lens seek operation. This is because light beam velocity detection based on the number of passing tracks per unit time becomes inaccurate when the velocity of the light beam is low and the positioner seek operation changes to the lens seek operation according to the inaccurate light beam velocity value. That is, velocity detection is inaccurate in the situation where the difference between the actual light beam velocity and the target light beam velocity is large.

In order to resolve this problem, a transition control operation is provided between the positioner seek operation and the lens seek operation. A structure of an optical disk apparatus carrying out a positioner seek operation, a transition control operation, and a lens seek operation will be explained below with reference FIG. 6, which is a diagram indicating the structure of an embodiment of an optical disk apparatus using the present invention.

The optical disk 1 is rotated at a constant velocity by a spindle motor 1a. The optical disk 1 may also be replaced with an optical magnetic disk. An optical head 30 is provided for the optical disk 1. The optical head 30 is capable of moving in the direction crossing the tracks by the VCM positioner 49. An object lens 32 is mounted on the optical head 30 for irradiating a light beam to a track surface of the optical disk 1. The object lens 32 is driven by a tracking actuator 36 to move the light beam in the direction crossing the tracks of the optical disk 1. Moreover, the light beam reflecting from the optical disk 1 is entered to a tracking error detector 48 using a 2-split photosensor and thereby the tracking error signal TES is detected based on the far field method (push-pull method). In addition, the VCM positioner 49 has a tachometer 90 (TM) as a velocity sensor to detect, on real time basis, the driving velocity of VCM positioner 49, namely the moving velocity of the optical head 30. Therefore, the light beam velocity, that is, positioner velocity, can be detected by the tachometer 90 without any load on the processor 70.

A track servo loop consisting of the track servo circuit 28, the servo switch SWI, the adder 74, the power amplifier 76 and the tracking actuator 36 is provided to realize a tracking control for causing the light beam to follow the tracks of the optical disk 1 with the tracking actuator 36. When the track servo is ON by switching ON the servo switch SWI by the processor 70, the track servo loop drives the tracking actuator 36 to keep the tracking error signal TES at zero, causing the light beam from the object lens 32 to follow the desired track center of the optical disk 1.

A focus servo loop for focusing the light beam on the target track of the optical disk 1 is not shown in the figure because it is well known to a person skilled in the art that the processor 70 controls the focusing actuator 38 (the focusing coil 60) in accordance with an output signal from the photosensor 56 shown in FIG. 3 for detecting focus error. Meanwhile, after the processor 70 receives an instruction of a seek operation from the host controller (not shown), the processor 70 conducts a positioner seek operation by driving the VCM positioner 49. Then, the processor 70 conducts a transition control operation, and finally a lens seek operation. The positioner seek operation, the transition control operation and the lens seek operation are realized by the program control of processor 70, which uses the following structures to carry out these operations.

First, the DA converter 78, the power amplifier 80, and the VCM positioner 49 are used for the positioner seek operation. Second, an AD converter 92 for fetching a detection signal of the tachometer 90 of the VCM positioner 49 to the processor 70 is used for conducting the velocity feedback control for the VCM positioner 49 in the transition control operation following the positioner seek operation.

Third, a DA converter 72 is also provided for driving the tracking actuator 36 in the lens seek operation following the transition control operation and output of the DA converter 72 is applied to the adder 74.

Finally, the comparator 82 for detecting the zero cross signal TZC from the tracking error signal TES, the difference counter 84 for detecting the current number of remaining tracks up to the target track, and the interval counter 86 for measuring the passing time per unit of the light beam, are provided as the structure for detecting the light beam velocity in the positioner seek, the transition control operation and the lens seek operation by the processor 70. The tachometer is also provided as the structure for detecting the light beam velocity, that is, positioner velocity in the transition control operation.

Then, the instruction for the seek operation is issued to the processor 70 from the host controller, and the number of remaining tracks up to the target track, that is, the track difference, is preset to the difference counter 84. After that, the number of remaining tracks of the difference counter 84 is subtracted on each passing of a track by the zero-cross signal TZC output from the comparator 82, and the current number of remaining tracks is notified to the processor 70 from the difference counter 84.

The method of detecting the actual light beam velocity by the processor 70 in each seek operation will be explained below. In the positioner seek operation, first, a number of passing tracks per detection period T1 is obtained based on differences between the preceding and current number of remaining tracks in each predetermined detection period T1. Then, a distance which the light beam has traversed during a detection period T1 is obtained by multiplying the one track width, e.g., 1.6 μm, by the number of passing tracks. Finally, the light beam velocity is determined by dividing the distance by the detection period T1. In the transition control operation, the actual light beam velocity is obtained from the tachometer 90 by fetching a value of the AD converter 92 on each detection period T2. In the lens seek operation, the actual light beam velocity is obtained as the inverse number of the passing time of the one track for each track measured by the interval counter 86. The detection period T3 is varied in accordance with the passing time of the one track.

Here, a relationship T1>T2 is established between the positioner seek velocity detection period T1 and transition control velocity detection period T2. These periods are determined, for example, as indicated below.

T1=200 μs
T2=100 μs
T3—60 μs—120 μs.

That is, the servo control bandwidth during the lens seek operation by the tracking actuator 36 is as high as 1.5 kH₂, otherwise, the servo control band during the positioner seek operation by the VCM positioner 49 is as low as 500H₂. Therefore, the light beam velocity detection period T1 (for example, 200 μs) in the positioner seek operation should be longer than the light beam velocity detection period T3 (one track passing time: 120 μs—60 μs) in the lens seek operation. However, the light beam velocity determined by the processor 70 changes so as to disable the velocity control of the tracking actuator 36 after the lens seek operation has started, when the velocity of the tracking actuator 36 changes largely within the detection period of the positioner seek operation, due to eccentric rotation of the optical disk 1, disturbance forced to the optical disk apparatus, etc. In the invention, this problem does not occur when the lens seek operation has been started because before transferring the lens seek operation seek operation from the positioner seek operation, the VCM positioner, the velocity of the light beam, that is, is measured under the transition control operation using T2 which has a shorter time cycle than the detection period T1 and the actual light beam velocity becomes very close to the velocity at which the velocity control can stably operate.

Figure 6:
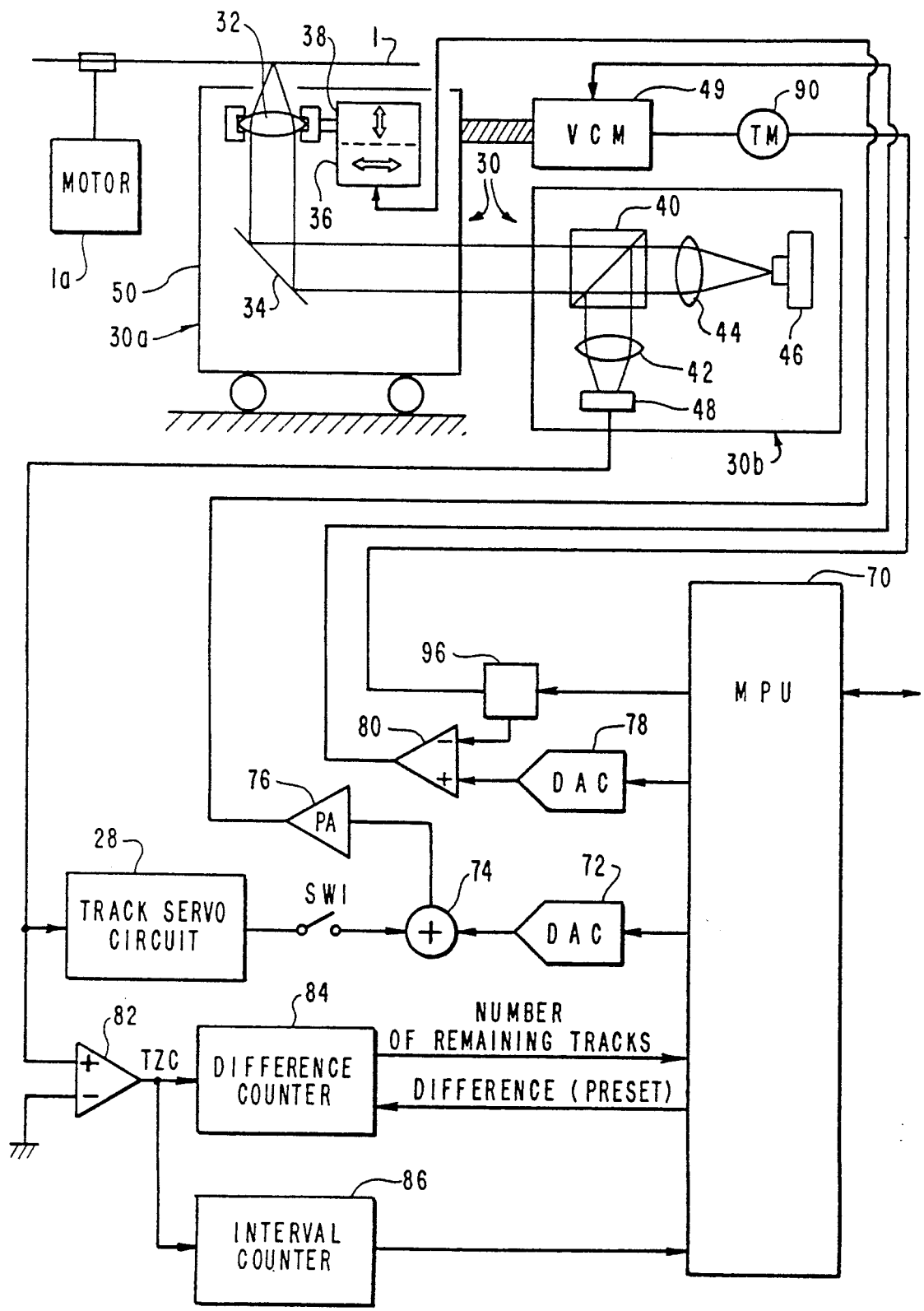
FIG. 6 is a schematic diagram indicating a structure of an embodiment of an optical disk apparatus using the present invention.
Figure 7:
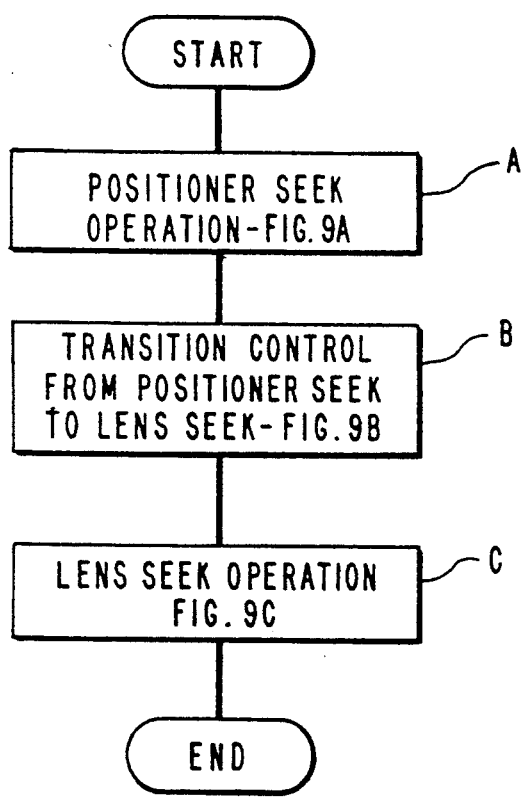
FIG. 7 is a flowchart of a generic seek operation of the optical disk apparatus shown in FIG. 6.
Figure 8:
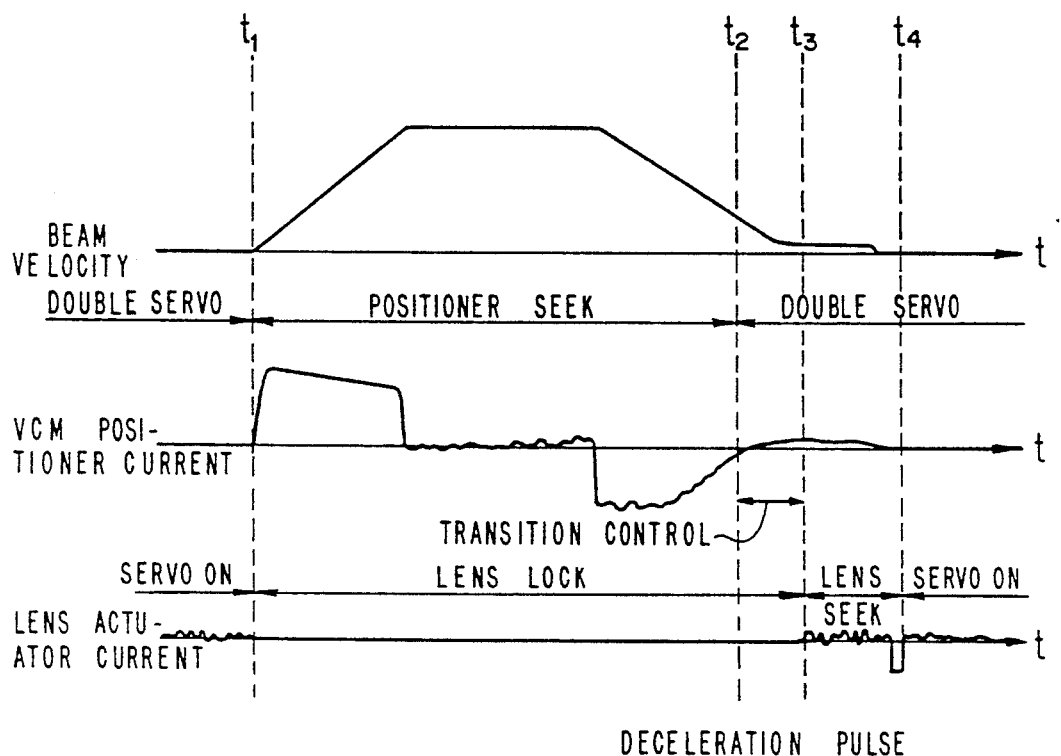
FIG. 8 is a diagram for explaining the generic seek operation shown in FIG. 7.

FIG. 7 is a flowchart of a generic seek operation of the optical disk apparatus shown in FIG. 6. FIG. 8 is a diagram for explaining the generic operation shown in FIG. 7. When the seek instruction is issued to the processor 70 at the time t1 from the host controller, the positioner seek control is carried out in the step S1 (hereinafter "step" will be omitted). In this positioner seek control, the servo switch SW1 is first turned OFF to cancel the tracking control under the track servo circuit 28. Then, a velocity error is obtained by subtracting the actual light beam velocity from the target light beam velocity read out from a target light beam velocity table provided in the processor 70, based on the number of remaining tracks from the difference counter 84. Then, a value obtained by multiplying the velocity error by a predetermined control gain is converted by the DA converter 70. Thereby, a drive current is applied to the VCM positioner 49 through the power amplifier 80. Specifically, a drive current indicated as the VCM positioner current at the time t1 − t2 in FIG. 8 is applied and the velocity control, that is, an acceleration for the former half, a constant velocity for the intermediate period and a deceleration for the latter half, is carried out.

When the number of remaining tracks reaches the predetermined value at the time t2 during the deceleration of the light beam velocity by the positioner seek control, for example 64 tracks, the seek control is transferred to the transition control operation from the positioner seek operation. In this transition control operation, the light beam velocity is obtained by the processor 70. However, a current control of the VCM positioner 49 based on the velocity error between the light beam velocity computed by the processor 70 and the target light beam velocity is not carried. That is, the current control is no longer carried out to compute the actual light beam. The processor 70 carries out the velocity feedback control for current control of the VCM positioner 49 through the DA converter 78 and the power amplifier 80, by setting the converter 78 a target velocity which is a velocity capable of the lens seek operation, e.g. a half velocity of the maximum velocity of the lens seek operation, and turning on a switch 96 for serve control of the VCM positioner 49 in accordance with velocity error between the velocity detection signal of the tachometer 90 and the target light beam velocity. Therefore, in the transition control, the arithmetic processing drive current of the VCM positioner 49 based on the beam velocity obtained from the tracking error signal during the positioner seek operation is now suspended. Thereby the processing load of the processor 70 can be reduced to the extent that the processing is suspended, and a velocity detection period as short as the velocity detection period $T2 = 100$ μs can be realized because the processing load of processor 70 is reduced.

In the transition control operation from the time t2, when the light beam velocity detected in the transition control operation is lowered to the maximum velocity at which the lens seek operation is capable of performing, the seek operation is transferred to the lens seek operation at the time t3. In the lens seek operation, the current control is carried out in a manner such that the light beam velocity is computed from the passing time of the track of the interval counter 44, and the current in such a value obtained by multiplying the velocity error between the actual light beam velocity and the target light beam velocity obtained from the number of remaining tracks at that time, is applied to the tracking actuator 36 through the DA converter 72, the adder 74 and the power amplifier 76. Immediately before the target track, for example, before one track, the deceleration pulse having the level of maximum deceleration voltage is output to the tracking actuator 36 for making the light beam velocity zero. When the light beam reaches the target track at the time t4, the servo switch SW1 is turned ON. After that, the tracking control is started. The pulse width in accordance with the beam velocity at this time is used as the pulse width of this deceleration pulse.

Next, details of the positioner seek operation, the transition control operation and the lens seek operation of the present invention indicated in the steps A-C of FIG. 7 will be explained by referring to FIGS. 9A, 9B and 9C.

Figure 9A:
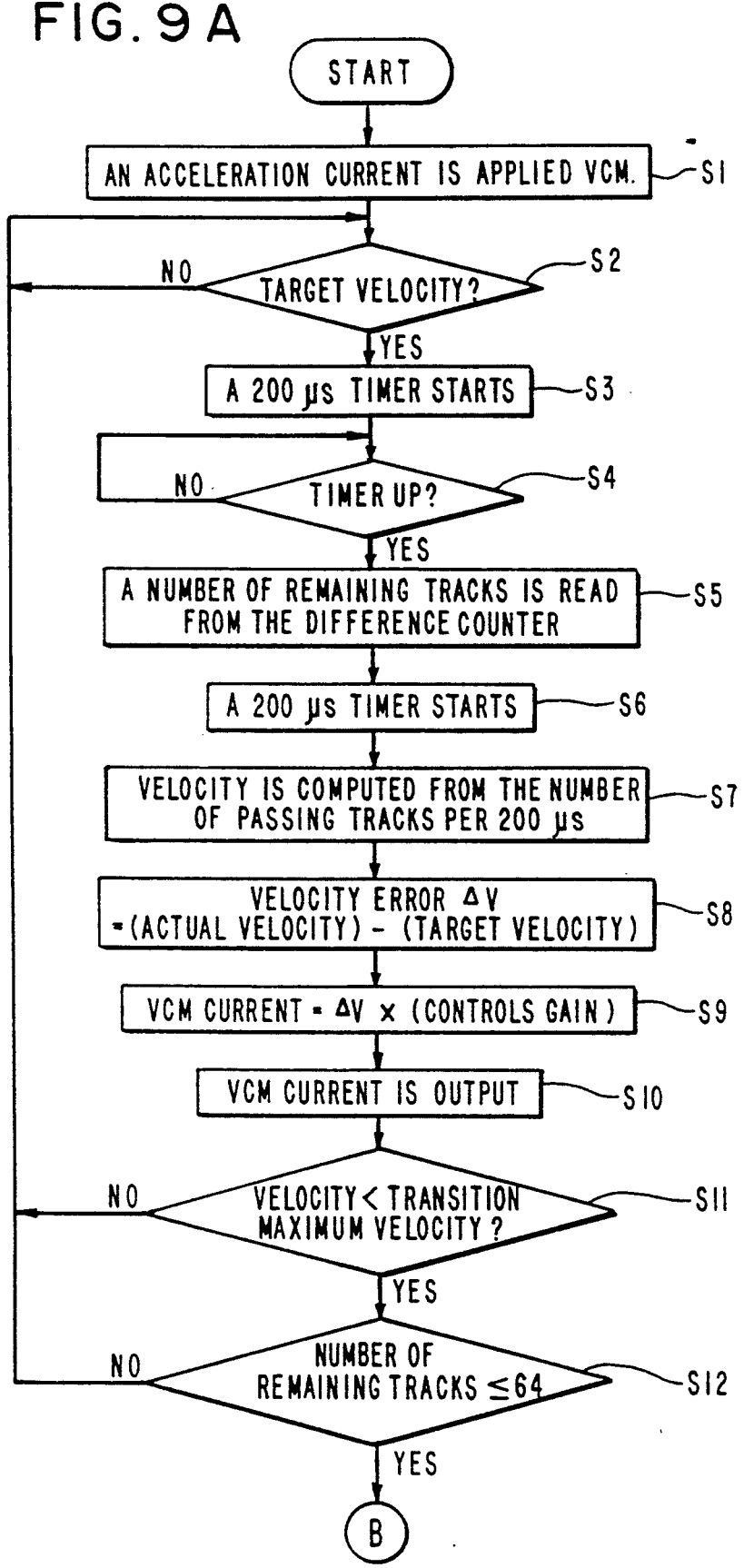

FIG. 9A is a flowchart indicating the positioner seek operation of the optical disk apparatus shown in FIG. 6. In FIG. 9A, in the step S1, when an instruction of the seek operation is received from the host controller by the processor 70, the processor 70 generates a target light beam velocity pattern based on the target track number and a current track number of the track at which the light beam is positioned at that time, and applies an acceleration current to the VCM positioner according to the target light beam velocity pattern. Before that, the track servo control is kept OFF by turning OFF the switch SW1.

After it is determined whether the actual light beam has reached the target light beam velocity in the step S2, a 200 μs timer is started in step S3. The 200 μm timer is provided in the processor 70 and determines the light beam velocity detection period T1. Additionally, in the beginning of the positioner seek operation, the step S2 is omitted because the actual light beam velocity cannot be obtained by the processor 70.

In the step S4, it is determined whether the 200 μs timer has reached time-up state. If the 200 μs timer has reached time-up, the number of remaining tracks up to the target track is read out from the difference counter 84 by the processor 70 in the step S5. The 200 μs timer is then started again in the step S6.

In the step S7, the actual light beam velocity is computed based on the number of passing tracks in the velocity detection period $T1 = 200$ μs by the processor 70. That is, the number of tracks through which the beam has passed during the velocity detection period $T1 = 200$ μs from the preceding to the current periods can be obtained by subtracting the current number of remaining tracks of the difference counter 84 from the number of remaining tracks obtained in the preceding detection period. Then, since the width of a single track is already known, e.g. 1.6 μm, the beam passing distance can be obtained by multiplying the Finally, the light beam velocity can be computed by dividing the beam passing distance by the detection period T1 ($=200$ μs).

In the step S8, the velocity difference ΔV is obtained by determining the difference between the target light beam velocity obtained by searching the target table depending on the number of remaining tracks at this time and the beam velocity obtained in S7, that is, the actually measured velocity. Then, in the step S9, a value is computed as drive current data of the VCM positioner 49 by multiplying the velocity difference ΔV by a predetermined control gain. Thereafter, the VCM drive current data computed in the step S9 is set to the DA converter 78 and a VCM drive current is output to the VCM positioner 49 through the power amplifier 80 in the step S10.

In the step S11, it is determined whether the actual light beam velocity becomes lower than the maximum velocity capable of the transition control operation. The steps from S2 to S10 are repeated until it is determined that the light beam velocity is lowered to the maximum velocity capable of the transition control operation.

When the light beam velocity becomes lower than the maximum velocity due to the deceleration of the positioner seek in the step S11, it is determined whether the number of remaining tracks has reached, for example, 64 tracks. The steps from S2 to S11 are repeated until this number of remaining tracks reaches 64 tracks. When it is confirmed that the number of remaining tracks equals 64 tracks in the step S12, the transition control operation is initiated. FIG. 9B is a flowchart indicating the transition control operation of the optical disk apparatus shown in FIG. 6.

In the transition control operation in the step S13, the feedback control of the VCM positioner 49 is turned ON based on the detected velocity of positioner tachometer 90 by a switch 96 turned ON under control of the processor 70. Then, a 100 μs timer which determines detection period T2 in the transition control operation is started in the step S14. Next, after the timeup of the 100 μs timer is determined in the step S15, the number of remaining tracks is read out from the difference counter 84 in the step S16 and also the one track passing time is read out from the interval timer 86 in the step S17. Moreover, in the step S18, the time required until actual sampling from the interval timer 86 from detection of passing tracks by the TZC signal is measured with a fraction timer (not shown) provided in the processor 70.

Next, the 100 μs timer starts again in the step S19. In the step S20, the track position during the sample time is obtained up to the fraction by dividing the time obtained in the step S18 by the passing time of the one track from the interval timer 86 obtained in the step S17.

Then the processor 70 determines the number of remaining tracks with a fraction, and the processor 70 obtains a target light beam velocity by searching the target light beam velocity table based upon the number of remaining tracks with a fraction. Then the processor 70 calculates a velocity difference between the target light beam velocity and an actual light beam velocity detected by the tachometer 90.

After that, the velocity difference ΔV between the target light beam velocity obtained by searching the target light beam velocity table and the actual light beam velocity obtained by the tachometer 90 is computed by the processor 70.

Then, a value is computed as drive current data of the VCM positioner 49 by multiplying the velocity difference ΔV by a predetermined control gain. Here, the VCM drive current data is not set to the DA converter 78 and a VCM drive current is not output to the VCM positioner 49 through the power amplifier 80.

As explained above, in the step S20, the target light beam velocity is computed and obtained more accurately, so the velocity comparison for a transfer to a lens seek operation becomes accurate and the seek operation can transfer to the lens seek operation at a velocity high enough for the lens seek operation.

In the step S21, it is determined whether the light beam velocity V computed in the step S20 becomes lower than a maximum velocity Vmax capable of the lens seek operation, and the steps from S15 to S20 are repeated until the light beam velocity becomes lower than the maximum velocity.

When the beam velocity becomes lower than the maximum velocity, it is determined whether the zero cross signal TZC of the tracking error signal TES is 0 in the step S22. When TZC becomes 0, processing goes to the step S23. After the timing of TZC=1 is detected, the seek operation is transferred to the lens seek operation. That is, in the steps S22 and S23, a track synchronization is established for detecting the initial part of the track.

Figure 9B:
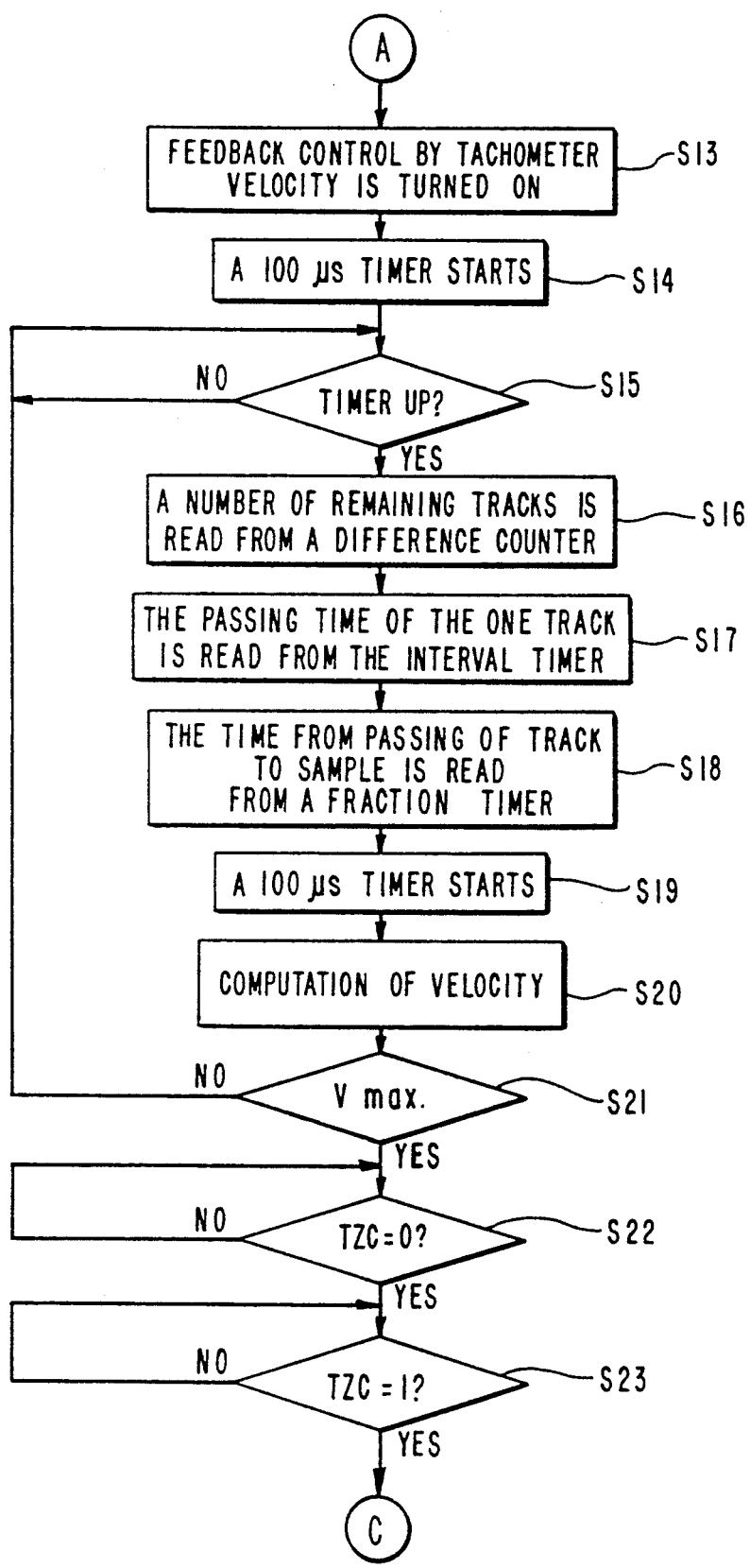

FIG. 9C is a flow chart indicating the lens seek operation of the optical disk apparatus shown in FIG. 9B.

In FIG. 9C, the number of remaining tracks is read out from the difference counter 84 in the step S24, and the passing time per one track is read out from the interval timer 86 in the step S25. The light beam velocity is then computed as the inverse number of the passing time per one track in the step S26. In the step S27, it is determined whether the beam velocity computed in S26 is within a specified velocity range. This range is between the upper limit α determined by adding a predetermined value considering disturbance to the preceding velocity and the lower limit β predetermined value considering disturbance from the preceding velocity. This is because it is for the processor 70 to prevent detection error of beam velocity due to variation of the tracking error signal TES, which causes the ID area at the heading part of a track as shown in FIG. 10.

Figure 10:
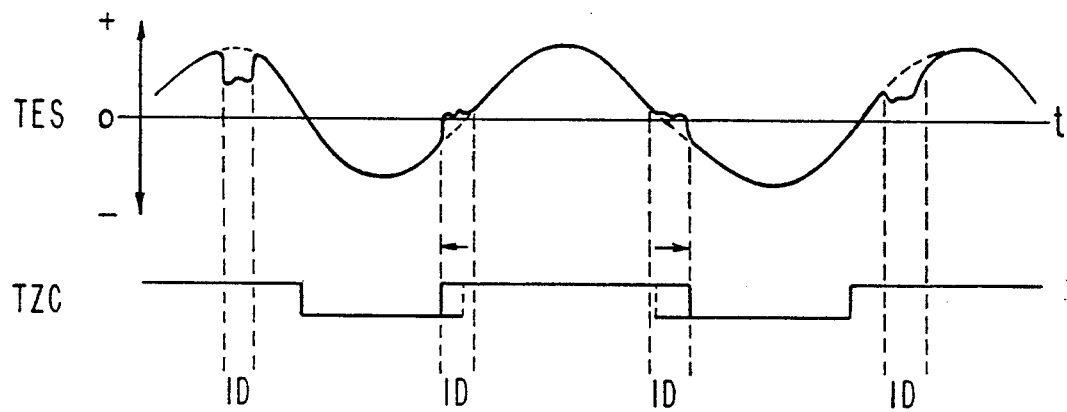
FIG. 10 is a diagram for explaining a variation of the tracking error signal causing a change in the level of the ID area at the heading part of track.

That is, as shown in FIG. 10, the tracking signal TES to be used for velocity detection in the seek operation has a characteristic to change the level in the ID area (preformat area) at the heading of a sector of tracks. Accordingly, where the ID area is close to the zero cross point of the tracking signal, the inversion timing by the comparator 82 is different from the true track passing timing and thereby the detected light beam velocity in the lens seek operation is deviated by a considerable extent from the inherent velocity.

When the light beam velocity is within the range between the upper limit α and lower limit β, the velocity error ΔV is computed in the step S29 by using the light beam velocity obtained in the step S26. On the other hand, where the light beam velocity is out of the range between the upper limit α and lower limit the processing goes to the step S28. Then, in the step S29, the velocity error ΔV is obtained by using the preceding velocity in place of the current beam velocity. The target light beam velocity used for computation of velocity error ΔV in the step S29 may be obtained by making access to the target light beam velocity table in the processor 70 with the number or remaining tracks read in the step S24.

Thereafter, a current value of the tracking actuator 36 is obtained in the step S30 by multiplying the velocity error by the predetermined control gain, and a drive current is output to the tracking actuator 36 in the step S31.

It is then determined whether the number of remaining tracks has reached one track in the step S32. Where two or more tracks are left, track synchronization is established as in the steps S22, S23 in FIG. 9B, with the steps S33 and S34. Then, the steps S24–S31 are repeated.

When the number of remaining tracks becomes 1 in the step S32, the processing goes to the step S36 after waiting for the zero cross signal TZC to become equal to 1 in the step S35. TZC signal becomes zero in the step S36 and TC pulse current is output. In the steps S35 and S36, the zero cross point is discriminated due to output of the current pulse in the step S37 when the tracking error signal TES changes to the minus direction. Therefore, TZC=0 may be obtained in the step S35 and TZC=1 may be obtained in the step S36.

When the output of the stop pulse current terminates in the step S37, since the light beam would be located at the target track position, the track servo is turned ON in the step S38 and thereby the tracking control starts.

FIG. 11 is a diagram indicating a structure of another embodiment of the optical disk apparatus using the present invention. In FIG. 11, an adder 98 and a sensor 100 are added to the optical disk apparatus shown in FIG. 6. The sensor 100 detects a displacement of the tracking actuator 36, and outputs a detecting signal indicating the displacement value of the tracking actuator 36. The detecting signal is added to a drive current of the VCM positioner 49 from the DA converter 78 by the adder 98. An output signal of the adder 98 is input to the amplifier 80, and is then applied to move toward the same direction as the tracking actuator 36 to the VCM positioner 49 as the drive current of the VCM positioner 49. The VCM positioner 49 thereby moves the optical head 30 to offset the detecting signal of the sensor 100 when the tracking actuator 36 is driven by the drive current from the processor 70 through the DA converter, so the light beam can cross the tracks by only driving the tracking actuator 36 until the drive current of the tracking actuator 36 is not output from the DA converter 72 under control of the processor 70. The structure and function of the sensor 100, and the method and structure of the servo control system are shown in, for example, U.S. patent application Ser. No. 07/265,460, the disclosure of which is hereby incorporated by reference.

As explained above, the present invention provides the transition control operation having a velocity detection period that is shorter than that of the positioner seek operation. This is provided in the course of transfer from the positioner seek operation to the lens seek operation so sudden change of the velocity detection period of the beam velocity is suppressed, and also detection error is minimized of the beam velocity which is generated at the time of transfer to the different velocity detection method. Thereby a stabilized lens seek operation is realized by preventing irregular velocity control during transfer to the lens seek operation, resulting in a compatibility of high speed access and stable seek operation in the optical disk apparatus.

In addition, it is determined whether the light beam velocity is within the predetermined range around the preceding velocity for each detection of velocity conducted in the predetermined period during the lens seek. And, if the velocity deviates from the predetermined velocity range, it is considered as irregular velocity and the preceding beam velocity is unused. Thus, irregular control by erroneous detection of beam velocity due to waveform change of the tracking error signal by the ID area of tracks in the zero cross timing can be avoided and a stable lens seek operation can be realized.

We claim:

1. An optical disk apparatus comprising:
an optical disk rotated at a predetermined velocity, said optical disk having tracks;
an optical head having an object lens incident to a light beam from a light source for said optical disk;
a positioner to move said optical head in a direction crossing the tracks of said optical disk;
a tracking actuator, mounted on said optical head, to actuate the object lens to move the light beam in the direction crossing the tracks;
positioner seek control means for controlling said positioner by producing a target light beam velocity based on a current track position and a target track position, detecting a light beam velocity at a first time interval, and moving said positioner to cause the light beam velocity to be coincident with the target light beam velocity in accordance with an error value between the target light beam velocity and the detected light beam velocity, said positioner seek control means controller acceleration and deceleration of the light beam;
transition control means for controlling said positioner by detecting a light beam velocity at a second time interval which is faster than for the first time interval, where in controller deceleration of the light beam by said positioner seek control means, the light beam velocity detected by said positioner seek control means is lowered below a first predetermined velocity; and
lens seek control means for controlling said tracking actuator to move the light beam to the target track position by detecting light beam velocity, and controlling said tracking actuator based on an error between the target light beam velocity and the detected light beam velocity, wherein in controlling deceleration of the light beam, the light beam velocity detected by said transition control means is lowered below a second predetermined light beam velocity at which control of said positioner by said lens seek control means is possible.

2. An optical disk apparatus comprising:
an optical disk rotated at a predetermined velocity, said optical disk having tracks;
an optical head having an object lens incident to a light beam from a light source for said optical disk;
a positioner to move said optical head in a direction crossing the tracks of said optical disk;
a tracking actuator, mounted on said optical head, to actuate the object lens to move the light beam in the direction crossing the tracks;
positioner seek control means for controlling said positioner, by producing a target light beam velocity based on a current track position and a target track position, detecting a light beam velocity at a first time interval, and moving said positioner to cause the light beam velocity to be coincident with the target light beam velocity in accordance with an error value between the target light beam velocity and the detected light beam velocity, said positioner seek control means controlling acceleration and deceleration of the light beam;
transition control means for controlling said positioner by detecting a light beam velocity at a second time interval which is faster than the light target beam velocity at the first time interval, where in controlling deceleration of the light beam by said positioner seek control means a remaining track number of the tracks remaining to the target track becomes a predetermined number; and
lens seek control means for controlling said tracking actuator to move the light beam to the target track position by detecting light beam velocity, and controlling said tracking actuator based upon an error between the target light beam velocity and the detected light beam velocity, where in controlling deceleration of the light beam, the light beam velocity detected by said transition control means is lowered below a second predetermined light beam velocity at which control of said positioner by said lens seek control means is possible.

3. An optical disk apparatus comprising:
an optical disk rotated at a predetermined velocity, said optical disk having tracks;
an optical head having an object lens incident to a light beam from a light source for said optical disk;
a positioner to move said optical head in a direction crossing the tracks of said optical disk;

a tracking actuator, mounted on said optical head, to actuate the object lens to move the light beam in the direction crossing the tracks;

positioner seek control means for controlling said positioner by producing a target light beam velocity based on a current track position and a target track position, detecting a light beam velocity at a first time interval, and moving said positioner to cause the light beam velocity to be coincident with the target light beam velocity in accordance with an error value between the target light beam velocity and the detected light beam velocity;

transition control means for controlling said positioner for detecting a light beam velocity at a second time interval which is faster than for the first time interval, where in controlling deceleration of the light beam, the light beam velocity detected by said positioner seek control means is lowered below a first predetermined velocity and a remaining track number of tracks remaining to the target track becomes a predetermined number; and lens seek control means for controlling said tracking actuator to move the light beam to the target track position by detecting light beam velocity, and controlling said tracking actuator based on an error between the target light beam velocity and the detected light beam velocity, where in controlling deceleration of the light beam, the light beam velocity detected by said transition control means is lowered below a second predetermined light beam velocity at which control of said positioner by said lens seek control means is possible.

4. An optical disk apparatus as recited in claim 1, further comprising:
tracking error detecting means for detecting a tracking error based on a light beam reflected from said optical disk, and outputting a tracking error signal; and
said positioner seek control means detecting the light beam velocity based on the tracking error signal.

5. An optical disk apparatus as recited in claim 4, wherein said positioner seek control means determines a crossed track number during the first time interval based on the tracking error signal, and calculates a light beam velocity based on the crossed track number.

6. An optical disk apparatus as recited in claim 5, wherein said positioner seek control means comprises a difference counter indicating the remaining track number, and wherein said positioner seek control means determines the crossed track number in accordance with a difference value of the difference counter during the first time interval.

7. An optical disk apparatus as recited in claim 1, further comprising:
a velocity sensor for detecting a moving velocity of said positioner and outputting a velocity signal.

8. An optical disk apparatus as recited in claim 7, wherein said velocity sensor is a tachometer fixed to said positioner.

9. An optical disk apparatus as recited in claim 4, wherein said lens seek control means determines a passing time of the light beam per track based on the tracking error signal, and calculates a light beam velocity based on the passing time.

10. An optical disk apparatus as recited in claim 9, wherein said lens seek control means uses a preceding light beam velocity calculated during a preceding time interval in place of a light beam velocity calculated for a current time interval when the light beam velocity calculated during the current time interval is beyond a specified range of the preceding light beam velocity.

11. An optical disk apparatus as recited in claim 1, further comprising:
means for detecting displacement of said tracking actuator and outputting a displacement signal; and
means for driving said positioner to negate the displacement signal in accordance with the displacement signal.

12. An optical disk apparatus as recited in claim 11, further comprising:
tracking error detecting means for detecting a tracking error based on a light beam reflected from said optical disk and outputting a tracking error signal.

13. An optical disk apparatus as recited in claim 12, wherein said positioner seek control means determines a crossed track number during the first time interval based on the tracking error signal, and calculates a light beam velocity based on the crossed track number.

14. An optical disk apparatus as recited in claim 13, wherein said positioner seek control means comprises a difference counter indicating the remaining track number, and wherein said positioner seek control means determines a crossed track number in accordance with a difference value of the difference counter during the first time interval.

15. An optical disk apparatus as recited in claim 11, further comprising:
a velocity sensor for detecting a moving velocity of said positioner and outputting a velocity signal.

16. An optical disk apparatus as recited in claim 15, wherein said velocity sensor is a tachometer fixed to said positioner.

17. An optical disk apparatus as recited in claim 12, wherein said lens seek control means determines a passing time of the light beam per track based on the tracking error signal, and calculates a light beam velocity based on the passing time.

18. A transition control apparatus for an optical disk apparatus having an optical head with an object lens for focusing a light beam onto one of plural tracks of an optical disk storage medium, the optical head being mounted on a positioner of the optical disk apparatus, for moving the light beam in a direction to cross the plural tracks, and a tracking actuator of the optical disk apparatus being mounted on the optical head and coupled to the object lens, for moving the light beam in the direction to cross the plural tracks by moving the object lens, the optical disk apparatus having a positioner seek control mode in which the light beam is moved to a target track during a first time interval using the positioner, and a lens seek control mode in which the light beam is moved to the target track during a second time interval using the tracking actuator, said transition control apparatus comprising:
a transition controller coupled to the positioner, which determines a light beam velocity to control the light beam velocity by electromechanically sensing a velocity of the positioner during a third time interval between the first and second time intervals.

19. A transition control apparatus as claimed in claim 18, wherein the transition controller includes a tachometer for electromechanically sensing the velocity of the positioner.

20. An optical disk apparatus for use with an optical disk having tracks, comprising:

an optical head having an object lens transmitting and receiving a light beam to and from, respectively, the optical disk;

a positioner coupled to the optical head, for moving the optical head in a direction crossing the tracks of the optical disk;

a velocity sensor electromechanically coupled to the positioner;

a tracking actuator coupled to the optical head, for actuating the object lens to move the light beam in the direction crossing the tracks, the positioner being moved based on a first target light beam velocity determined based on a current track position and a target track position during a positioner seek operation, the tracking actuator being controlled to move the object lens based on an error between a second target light beam velocity and a detected light beam velocity during a lens seek operation, and the positioner being controlled using a light beam velocity detected by the velocity sensor during a transition operation occurring between the positioner seek operation and the lens seek operation.

* * * * *

UNITED STATES PATENT AND TRADEMARK OFFICE
CERTIFICATE OF CORRECTION

PATENT NO.     : 5,241,522
DATED          : August 31, 1993
INVENTOR(S)    : Shigenori Yanagi It is certified that error appears in the above-identified patent and that said Letters Patent is hereby corrected as shown below:

<u>Column 14,</u>
Line 1, change "controller" to -- controlling --;
Line 6, change "controller" to -- controlling --;
Line 48, after "means" insert -- , --.

Signed and Sealed this

Second Day of April, 2002

Attest:

JAMES E. ROGAN
*Attesting Officer*       *Director of the United States Patent and Trademark Office*